United States Patent [19]

Tomason

[11] Patent Number: 4,544,595
[45] Date of Patent: Oct. 1, 1985

[54] PREFABRICATED PANEL FOR ROOF OR SIDING CONSTRUCTION

[76] Inventor: Garry Tomason, 1894A El Parque Ct., San Matio, Calif. 94403

[21] Appl. No.: 496,195

[22] Filed: May 19, 1983

[51] Int. Cl.$^4$ ................................................ B32B 3/12
[52] U.S. Cl. .................................... 428/116; 428/145; 428/149; 428/313.9; 428/316.6
[58] Field of Search ............... 428/157, 158, 159, 160, 428/313.9, 319.1, 116, 119, 141, 142, 144, 145, 149, 316.6

[56] References Cited

U.S. PATENT DOCUMENTS

| | | | |
|---|---|---|---|
| 3,993,608 | 11/1976 | Wells | 428/313.9 |
| 4,028,450 | 6/1977 | Gould | 428/160 |
| 4,082,702 | 4/1978 | Harper | 428/313.9 |
| 4,248,932 | 2/1981 | Tung et al. | 428/325 |
| 4,251,578 | 2/1981 | Kaufmann | 428/159 |
| 4,299,874 | 11/1981 | Jones et al. | 428/325 |
| 4,303,730 | 12/1981 | Torobin | 428/325 |

*Primary Examiner*—William J. Van Balen
*Attorney, Agent, or Firm*—Bruce & McCoy

[57] ABSTRACT

A pre-fabricated roofing and siding panel with simulated shingles or tiles has an exterior insulating layer composed of approximately 80% by volume hollow glass biosilicate beads suspended in a polyurethane foam. The exterior layer is bonded to a decking layer of a light honeycomb fiberglass sheet in a process where the decking layer is placed in the bottom of a mold and a mixture of the glass bubbles and a two component polyurethane foam is injected into the mold. To provide the panels strength and moisture integrity at their abutting edges, an improved dual interlocking construction is provided at the panel edges. An interlocking rib and groove are provided at the top and bottom edges of the decking layer to interlock the panel in a perpendicular plane, while a separate barrier ridge and groove are provided in the exterior layer to interlock the panel in the plane of the panel.

In a further aspect of the invention, nailess anchoring mechanisms for the panels include anchor plates molded into each panel and corresponding retaining brackets. Knurled retaining rods are used to anchor the panel to roof trusses or wall studs by forcing the knurled rod ends through opposing star fastener openings in the panel anchor plates and the retaining brackets when the retaining brackets are secured behind a structural member.

2 Claims, 12 Drawing Figures

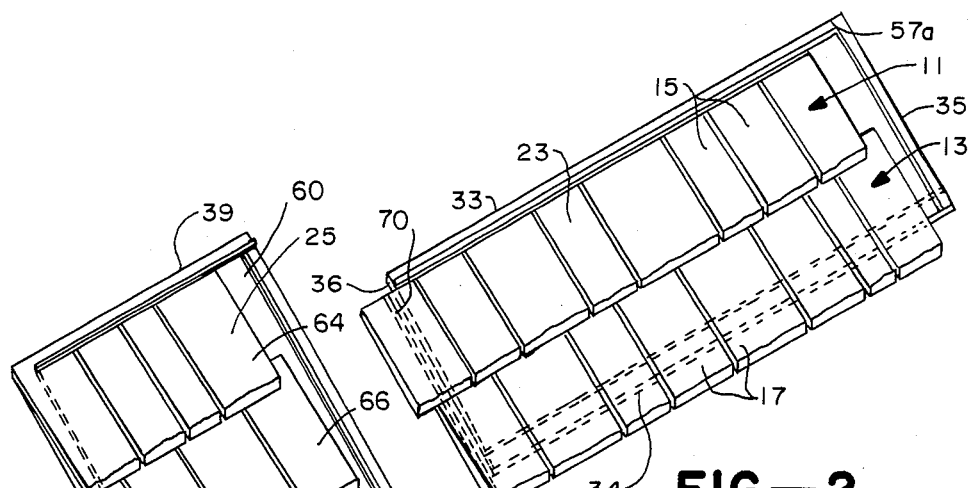
FIG.—2
FIG.—1
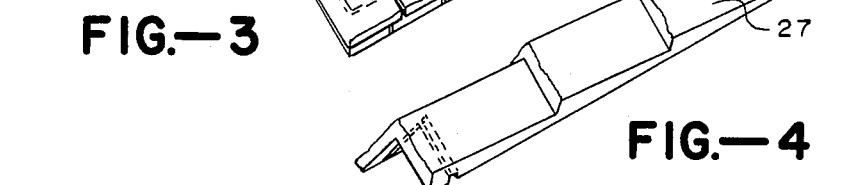
FIG.—3
FIG.—4
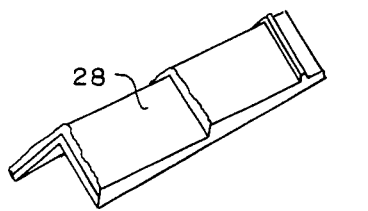
FIG.—4A
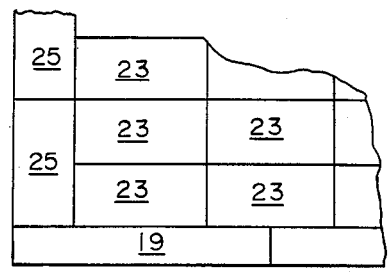
FIG.—5

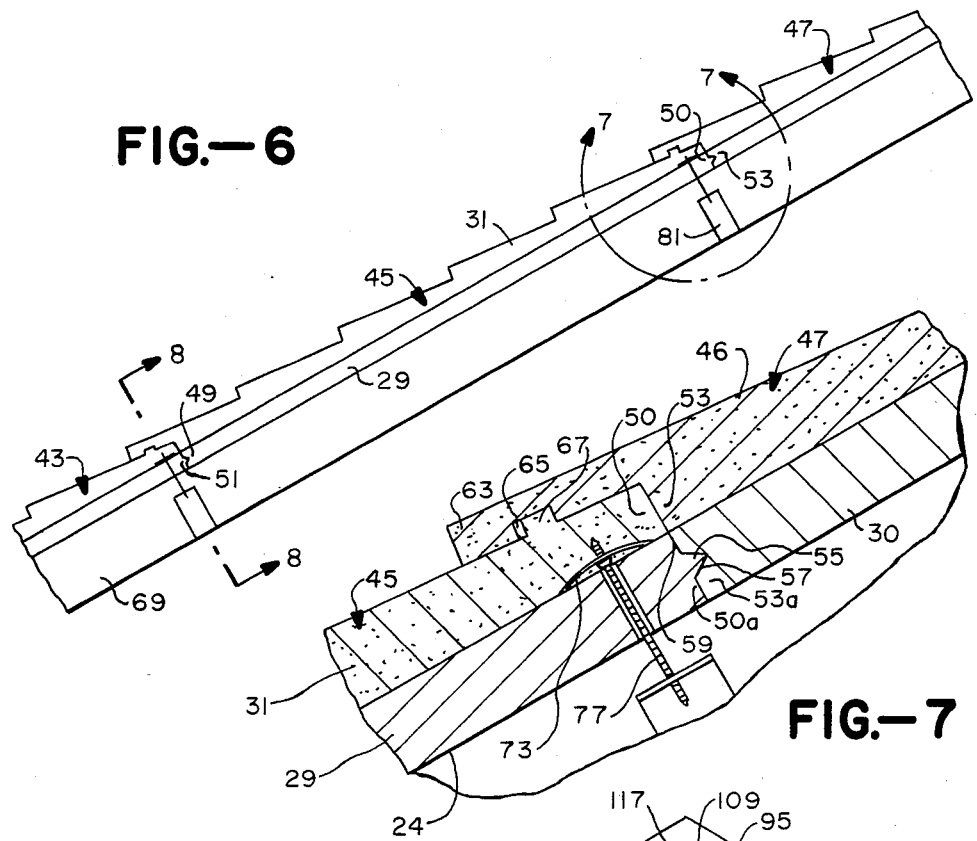
FIG.—6
FIG.—7
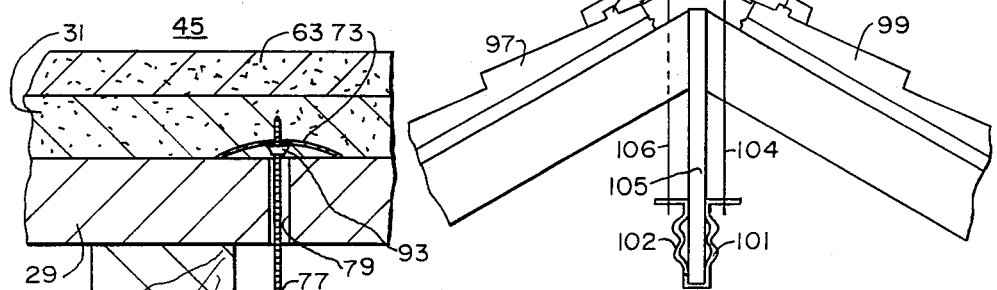
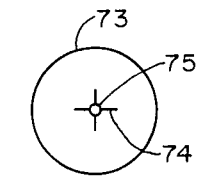
FIG.—8
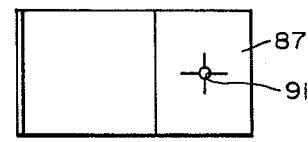
FIG.—9
FIG.—10   FIG.—11

PREFABRICATED PANEL FOR ROOF OR SIDING CONSTRUCTION

BACKGROUND OF THE INVENTION

The present invention relates generally to the field of pre-fabricated or partially pre-fabricated building construction, and particularly to pre-fabricated wall and roofing panels that provide a simulated exterior shingled or tiled appearance.

A number of different pre-fabricated wall and roofing panels have been devised wherein the panels are molded of a foam plastic to provide a desired external appearance. Examples of such prior art panels are shown in U.S. Pat. Nos. 4,065,899, 3,875,715, and 3,760,546, all of which show an insulating plastic foam panel or shingle construction with a molded decorative external appearance. Various interlocking constructions are provided to the panel edges with the goal of a leak proof, integral structure.

Despite the many advantages of existing foam prefabricated panels, it is desirable to provide a construction panel of a moldable insulating material that increases the panel's temperature and acoustical insulating properties and fire retardancy over that of convention panels while retaining light weight and high strength characteristics.

Acoustical insulation is a particular shortcoming of existing panel compositions. For housing built in the vicinity of airports it would be highly desirable to provide a construction panel that would be a good acoustical insulator. Roof and wall integrity at the joints between panels is equally important. Existing panels have relatively intricate and complex interlocking structures that can provide an insufficient seal between panels.

Finally, the integrity of a roofing or siding structure can be affected by the manner in which the panels are secured to the underlying roof trusses or wall structures. Nailing the panels from the outside such that the nail heads protrude through the panel is impractical because exposed nail heads will be a source for water leaks. Conventional panels have sought to overcome this problem by covering the nail heads with overlapping structures such as shown in U.S. Pat. No. 4,065,899, or by sealing strips cemented in place over the nail head such as shown in U.S. Pat. No. 3,875,715. In these existing structures, the problem of covering the nail heads complicates the installation of the structure, increases construction costs, and leaves the potential for leaks if installation is not properly done.

The present invention provides a simplified panel construction which can be readily fabricated by a molding process herein described, and which is easily installed without the problem of having to conceal exposed nail heads. The invention also provides for a unique composition of materials which substantially increases the acoustical and thermal insulation qualities of the panel and its fire retardancy. The panel of the present invention is so constructed so that it can be produced inexpensively and quickly installed, with the beneficial result of reduced construction cost.

SUMMARY OF THE INVENTION

The invention is an improved pre-fabricated panel for roof or siding construction which is comprised of a substantially rigid planar decking layer and an exterior insulating layer bonded to the decking to form a single integral panel structure. The decking layer preferably is fabricated of a honeycomb fiberglass sheet material whereas the preferred composition of the insulating exterior layer is a mixture of hollow glass beads in a suspension material, with the preferred proportion of glass beads to suspension material being approximately 80% by volume glass beads to 20% by volume suspension material. A two component polyurethane foam can be used as a suspension material in order to produce a moldable panel with an exterior simulated shingled or tiled surface. The hollow glass beads suspended in the polyurethane foam produce a composition panel of greatly improved insulating and fire retardancy qualities as compared to conventional construction materials.

A simplified and unique interlocking construction is given to the two layer panels such that the abutting top and bottom edges of adjacent panels can be rigidly interlocked with one another in the plane of the panel and in a plane that is perpendicular to the panel. Specifically, the interlocking construction includes a first interlocking means formed in the top and bottom edges of the panels decking layer whereby the top and bottom panel edges of adjacent panels can be fitted together edgewise to interlock the decking layers of the two adjacent panels in place and in proper perpendicular alignment; a second and separate interlocking means is formed on the upper exterior layer proximate the top and bottom panel edges to provide interlocking between the exterior layer of the two adjacent panels in the plane of the panel. This second interlocking means will co-act with the first interlocking means to provide a rigid and fluid impermeable junction between panels.

A further aspect of the invention is an anchoring means which does not require the use of nails and which permits the panel to be secured from its underside directly to the supporting roof trusses or wall studs. In accordance with the invention, anchoring plates are molded into the panel between the decking layer and exterior insulating layer at spaced intervals over the width of the panel. A star fastener opening is provided in each of the anchoring plates, and an opening is provided through the decking layer beneath each of the star fastener openings. The attachment hardware includes a retaining bracket having a cup shaped first end portion sized to fit over a panel supporting structural member, such as a truss or wall stud, and a second end portion having an extension wall and a base plate perpendicular thereto. The base plate has a star fastener opening which will be placed in opposition to the star fastener opening in one of the panel anchor plates. A knurled retaining rod secures together the retaining bracket and anchoring plate molded into the panel. This is done by forcing the knurled retaining rod ends through the opposing star fastener openings of the anchor plate and bracket base plate. The star fastener openings will securely grip the retaining rod as it is forced through the openings and will securely hold the panel to the truss or stud over which the retaining bracket is placed. Preferably, a stop is secured near the end of the knurled retaining rod which is forced into the anchor plate to prevent the knurled rod from penetrating the exterior layer of the panel. Also preferably the extension wall of the second end of the retaining bracket has a flexure portion which can provide spring tension against the retaining rod when the bracket base is forced up on to the knurled rod against the structural support.

It is therefore an object of the present invention to provide a pre-fabricated roofing panel which can be molded to have the apperance, shape and style of conventional shingles or tiles, or any other desired exterior appearance, and which can be produced economically and be easily installed. It is also an important object of the invention to provide a roofing panel which has superior thermal and acoustical insulating characteristics and high fire-retardancy, and which is not susceptible to leakage or weather related wear. It is intended that the interlocking features of the invention will provide for easy assembly, location, and alignment of panels, and additionally provide a double seal against weather and enhanced overall structural integrity. Because the panel materials are highly waterproof and weather resistant, and because the structure of the panel provides for interlocking between panels with a high degree of integrity against moisture leakage, and because there are no nail heads which need to be covered or sealed, the roof or wall constructed of the panels of the invention will be substantially impervious to the elements. Also because of the characteristics of the panel materials, the panel will be very stable and will not experience any appreciable expansion or contraction associated with temperature changes.

DESCRIPTION OF THE DRAWINGS

FIG. 1 is a perspective view of an end panel section, with a simulated shake roof appearance, made in accordance with the invention.

FIG. 2 is a perspective view of a simulated shake primary panel section made in accordance with the invention.

FIG. 3 is a perspective view of a simulated shake starter strip panel made in accordance with the invention.

FIG. 4 is a perspective view of a simulated shake capping strip for a roof made in accordance with the invention.

FIG. 4A is a perspective view of a simulated shake starter capping strip from which successive capping strips such as shown in FIG. 4 are layed down.

FIG. 5 is a pictorial representation of a panel layout utilizing starter strips, end panels, and primary panels.

FIG. 6 is an end elevation view of three installed and interlocked simulate shake panels made in accordance with the invention.

FIG. 7 is a cross-sectional view detail of two of the interlocking panels shown in FIG. 6.

FIG. 8 is a partial cross-sectional view of the panel shown in FIG. 7 showing in detail the anchoring means for securing the panels to the structural members.

FIG. 9 is a partial side elevation view of the apex of a roof showing the installation of the capping strip.

FIG. 10 is a top plan view of the anchor plate which is molded between the panel decking and insulating layer as shown in FIG. 8.

FIG. 11 is a top plan view of the retaining bracket which forms part of the anchoring means shown in FIG. 8.

DETAILED DESCRIPTION OF THE PREFERRED EMBODIMENT

Referring now to the drawings, FIGS. 1 through 4 generally illustrate the different parts used to construct an A-frame roof from pre-fabricated panels made in accordance with the invention. Each part is pre-formed as hereinafter described to simulate a shingled construction. Specifically, the panels simulate successive courses of overlapping shingles of more or less random widths, such as the two shingle courses 11, 13 having random shingles 15, 17 illustrated in the panel of FIG. 2. The various panels needed for constructing a roof include a starter panel 19 having a single course of shingles 21, larger, typically 4 foot by 8 foot primary panels such as panel 23 for constructing the main body of the roof, edge panels 25 for constructing the side portions of the roof, and a capping strip 27 and a capping starter strip 28 for the top of the roof. To accommodate different sized roofs, each pre-fabricated panel will be provided in different sizes from which a suitable selection can be made to achieve the coverage desired. FIG. 5 illustrates a typical layout of a combination of starter strips 21, primary panels 23, and edge panels 25 for one corner section of a large roof. The relative size of the panels are illustrative only and are not meant to limit the invention described herein to a particular size panel. Indeed, it shall be recalled that the invention as described herein will apply equally to the different roofing panel sections shown in FIG. 5 and in some aspects to the capping strip.

It is noted that while the description of the preferred embodiment herein is directed to and illustrates the use of panels of the invention in roofing construction, the panels can be used in a manner similar to that described for siding construction. The panels in siding construction are instead anchored in a vertical orientation to wall studs instead of to the roof trusses as illustrated.

Reference is briefly made to FIGS. 6 and 7, which best illustrate the construction of panels of FIGS. 1-3. Each of the FIGS. 1-3 panels has two separate bonded together layers, namely, a decking layer 29 of uniform thickness and an exterior insulating layer 31 which is preferably formed by a molding process hereinafter described to simulate the illustrated exterior shingle construction. The bonded together layers form an integral panel which, for the primary panel of FIG. 1, presents top and bottom edges 33, 34 and opposite side edges 35, 36, which will abut the top and bottom and side edges of similarly constructed adjacent panels. Edge abuttment with the starter strip 21 (FIG. 3) will only occur along the starter strip's top and side edges 37, 38, 39a, and, as can been seen in FIGS. 1 and 5, abutting edges will be presented by the edge panel 25 at the top and bottom edges 39, 40 and one side edge 41.

FIGS. 6 and 7 show the new interlocking construction of the panels. In FIG. 6 there is shown three interlocking primary panels 43, 35, 47, abutting to provide a continuous, integral roofing structure. The primary panel 45 has five courses of shingles and is interlocked at its bottom edge 49 to the top edge 51 of sub-adjacent panel 43, and at its top edge 50 to the bottom edge 53 of the super-adjacent panel 47.

With reference to FIG. 7, the interlocking construction for the abutting top and bottom edges of adjacent panels, in this case, the top and bottom edges 50, 53 of adjacent panels 45 and 47, consists of two basic and separate interlocking means. A first interlock means, in the form of a projecting locking rib 55 and corresponding locking groove 57, is formed on the top and bottom edges 50a, 53a of the respective decking layers 29, 30 of the two panels. The locking rib and groove extend substantially the width of the decking layer as illustrated by locking rib 57a on the primary panel 23 in FIG. 2. The locking rib, preferably triangular in shape, is located centrally of the edge of the decking layer such that planar edge surfaces or shoulders 59 are presented on either side of the rib and groove. Such interlocking rib and groove geometry will permit the two decking layers to be easily aligned and lockingly seated together.

As for the second interlocking means, a capping strip 63 extends integrally and downwardly from the bottom edge of the panel's exterior insulating layer, which in FIG. 7 is the insulating layer 46 of panel 47. A barrier groove 65 formed on the underside of capping strip 63 corresponds and mates to a barrier ridge 67 projecting upwardly from the exterior insulating layer of the adjacent panel 43 proximate the panel's top edge 50. It can be sen that each panel will have a capping strip and underside barrier groove along its bottom edge and a barrier ridge along its top edge in order to interlock adjacent panels of like construction. The first interlocking means will provide structural rigidity to the abutting panels and will act to prevent separating or bowing of the panels in a perpendicular plane, while the second interlocking means will provide surface sealing of the two panels along their top and bottom edges to prevent the intrusion of moisture through the panel top and bottom interfaces. The second interlock means will also enhance the overall rigidity of the interlocked panels and prevent panel separation in the plane of the panels while the panels are being anchored to the roof trusses 69.

It is noted that the barrier groove 65 on the underside of the capping strip 63 is preferably wider than the corresponding barrier ridge 67. The play between parts provided by oversizing the barrier groove will permit the capping strip to be easily interlocked over the barrier ridge. The air pocket in the wider groove will also prevent moisture from being drawn through the interfacing surfaces by capillary action.

In addition to the top and bottom edges, the panel side edges are also constructed to overlap and preferably interlock with abutting side adjacent panels. As shown in FIGS. 1 and 2, the decking at the right side edge of the FIG. 1 panel extends to form a decking surface 60 for underlapping an extended overlapping portion 62 of the simulated shingle exterior layer of an adjacent panel. The edge shingles 64, 66 at the panel edges are staggered to provide for an overlapping of adjacent panel shingles as would normally occur in a roof constructed of individual shingles. In this way the interface between side adjacent panels can not be detected. Interlocking along the abutting side edges can be accomplished by a side barrier strip 68 near the right side edge of the decking layer and a corresponding side barrier groove 70 underneath the overlapping portion 62 of the adjacent panel's exterior layer.

As shown in FIGS. 7 through 11, an anchoring mechanism is provided for anchoring the pre-fabricated panels to structural members such as the roof trusses 69 or wall studs (not shown). Generally, a plurality of anchoring mechanisms 71 are distributed along the width of a panel 45 near the top edge 50 of the panel at uniform spacings and typically on 18 inch centers corresponding to the conventional 18 inch spacing of roof trusses and wall studs. Each anchoring mechanism includes anchoring plate 73 shown as a dish shaped steel plate having a star fastener opening 75 formed by a drilled hole and radial cuts 74. The radial cuts produce an opening with depressable edges through which a knurled retaining rod 77, slightly larger in diameter than the anchor plate opening 75, can be forced. A retaining rod 77 forced through an anchor plate hole from the bottom of the panel will be lockingly held by an anchor plate due to the depressed edges of the hole wedging against the knurled rod surfaces.

The knurled retaining rod 77 passes through an oversized access hole 79 drilled in the decking beneath the star fastener opening of each of the panel's anchor plates; the rod is of sufficient length (it can simply be cut to length) to extend downwardly from the bottom of the decking plate to engage the retaining bracket 81 secured to an underlying structural support 69.

Turning now to the attachment hardware, the retaining bracket 81 has a generally cup shaped first end portion 83 sized to fit over the structural member, and a second end portion comprised of an extension wall 85 extending upwardly from one side of the first end portion and a base plate 87, with a star fastener opening 91, which extends outwardly at a substantially right angle from the top end of the extension wall. The extension wall is seen as having a flexure portion 89 whereby the extension wall can be forceably extended to provide spring tension against the knurled rod 77.

It can be seen from FIG. 7 that once the knurled rod is lockingly forced a suitable distance through the anchor plate 73, the retaining bracket can be lockingly forced onto the rod and the rod placed in tension by forcing the bracket base plate 87 upwardly against the spring tension in the flexure portion 89 of the bracket's extension wall 81. To prevent the retaining rod 77 from puncturing the insulation layer 31 of panel 45, thereby damaging the integrity of the panel, or in the worst case to prevent the retaining rod from completely puncturing the overlapping capping strip 63, a mechanical stop 93 is provided on the retaining rod to limit the penetration of the end of the rod through the anchor plate 73.

As shown in FIG. 9, the anchoring mechanism described above can also be used to anchor the roofing cap 95 to the topmost panels 97, 99 by using staggered anchoring mechanisms 101, 102 which secure to the center beam 105. The anchoring mechanisms 101, 102 are of a construction similar to the anchoring mechanism shown in FIG. 7, except that the retaining rods 104, 106 are longer to accommodate the extra reach from the bottom of the center beam 105 to the bottom of the roofing cap 95. (Again, the retaining rods can simply be cut to length from stock.) An anchor strip 109 is suitably secured to the underside of the roofing cap 95 and is provided with star fastener openings at spaced intervals down the anchor strip to accommodate retainings rods, such as 104 and 106, spaced along the center beam 105. It is seen that the anchoring mechanisms are alternatingly placed on either side of the center beam 105, preferably at 18 inch intervals, in order to provide a symmetrical anchoring force to the roofing cap. Installation of the roofing cap is readily achieved by placing the cap over the apex the roof and fixing the opposing barrier grooves over the opposite barrier ridges 107, 108 of the two opposite panels 97, 99. It would be preferable that prior to laying the roofing cap down, a bead of sealing material be placed in the space 117 above the center beam 105 to seal this area. The retaining rods 104 and 106 can then be forced up through the star fastener openings in anchor strip 109 and the retaining brackets (101, 102) lockingly secured to the downwardly extending rods.

Returning to FIGS. 6 and 7, the decking layer 29 of each panel is preferably fabricated of a honeycombed fiberglass sheet, the top side which is foamed as hereinafter described to form the exterior layer 31, and the bottom side 24 of which is covered with a thin flat sheet (approximately 30 mils) of fiberglass. The foamed exterior layer 31 is preferably fabricated of a unique insulating composition of hollow glass beads dispersed and held in a fire-retardant foam suspension material, such as a commercially available rigid polyurethane foam, cement, or other moldable, fire retardant material. A suitable two component polyurethane foam would consist of an A component of polymeric isocyanate and a polyol B component having a resin, catalyst, surfactant, freon, a fire-retardant additive, and miscellaneous pigments, fillers, and fibers to provide a suitable exterior appearance. The hollow glass bead component of the composition can be supplied by commercially available high quality sodium-lime-biosilicate glass bubbles such as sold by the 3M Company. The exterior insulating layer should be approximately 80% by volume hollow glass bubbles to 20% by volume fire retardant suspension material. The suspended hollow glass beads will provide a multitude of air pockets disbursed throughout the foamed exterior layer which will make the panel a superior thermal and acoustical insulator.

To produce a panel in accordance with the invention, the honeycomb decking material can be placed in the bottom of a mold designed to provide an exterior insulating layer with a desired appearance. A mixture of 80% by volume hollow glass beads and 20% fire retarding expandable polyurethane foam material is then pre-mixed and injected into the closed mold containing the decking sheet, whereupon the glass beads and foam mixture expands and fills the entire cavity of the mold to form the desired exterior layer. Using the above described two component polyurethane foam, the mixture will typically be cured for 12 to 20 minutes whereupon the two layer panel is removed from the mold. It is contemplated that after the panel is removed from the mold, it will be conveyed to a soft vacuum chamber where a coating of fire retardant material, such as molten silicone, aluminum or copper will be evaporaed onto the surface of the exterior layer. This will increase the fire retardancy of the panel.

Panels made in accordance with the foregoing description and provided with the anchoring mechanisms described can be easily installed to construct a roof or siding portion of a building. It can be seen with reference to the drawings that a roof is built up from panels layed down on the roof trusses beginning with a starter strip 19 and laying successive edge panels 25 and primary panels 23 up from the starter strip, with each panel being interlocked with adjacent panels along the top bottom and side edges. Securement of the panels to the roofing trusses is accomplished by laying out the panel, at each truss 69, and securing the panel along its top edge with a retaining bracket 85 and retaining rod 77. As above-described, this is done by first simply forcing the retaining rods 77 up through the panel anchor plates which are located through the retaining rod access holes 79 in the panel decking. Loose anchoring can initially be done to permit the panel to be adjusted vertically on the trusses to ensure firm abutment with the subadjacent panel or starter strip and side adjacent panel. Once this panel is in place and interlocked as shown in FIG. 2, the anchoring mechanisms are tightened by forcing the retaining bracket base plate 87 further up on the knurled retaining rod against the spring tension in the brackets extension wall 81.

Therefore, it can be seen that the present invention provides a panel construction with a simulated shingled, tile or other desired appearance that has improved acoustical, thermal insulating and fire-retardancy qualities, that further provide a relatively simple but effective interlocking structure at the abutment between panels, and that provides for the fast and efficient anchoring of the panels to roof trusses or wall studs to increase production efficiency.

Although the invention has been described in considerable detail in the foregoing specification and claims, it is not intended that the invention be limited to such detail, except as necessitated by the appended claims.

What I claim is:

1. An improved pre-fabricated panel for roof or siding construction comprising
    a substantially rigid and planar inner decking material fabricated of a honeycomb fiberglass sheet material,
    a thin flat sheet of fiberglass secured to the bottom side of the decking material,
    a top exterior insulating layer composed by volume of approximately 80 percent biosilicate hollow glass beads and 20 percent fire-retardant suspension material, and
    a coating of fire retardant material which is evaporation deposited on said exterior insualting layer.

2. The pre-fabricated panel of claim 1 wherein the evaporation deposited coating material is either silicone, aluminum, or copper.

* * * * *